United States Patent
Herzig et al.

(10) Patent No.: US 6,451,909 B1
(45) Date of Patent: Sep. 17, 2002

(54) MULTIPHASE FORMULATIONS OF ORGANOSILICON COMPOUNDS

(75) Inventors: Christian Herzig, Waging am See; Robert Schröck, Altötting; Petra Gratzl, Tüssling; Reinhard Stallbauer, Gumpersdorf, all of (DE)

(73) Assignee: Wacker-Chemie GmbH, Munich (DE)

( * ) Notice: Subject to any disclaimer, the term of this patent is extended or adjusted under 35 U.S.C. 154(b) by 75 days.

(21) Appl. No.: 09/738,026

(22) Filed: Dec. 14, 2000

(30) Foreign Application Priority Data

Dec. 14, 1999 (DE) .......................... 199 60 291

(51) Int. Cl.$^7$ .............................. C08L 83/10
(52) U.S. Cl. ........................... 524/837; 528/12; 528/15; 528/31; 528/25; 525/479; 525/474; 524/81; 524/306
(58) Field of Search .............................. 528/12, 15, 31, 528/25; 524/837, 81, 306; 525/479, 474

(56) References Cited

U.S. PATENT DOCUMENTS

| | | | |
|---|---|---|---|
| 2,476,166 A | | 7/1949 | Wayo |
| 3,445,420 A | | 5/1969 | Kookootsedes |
| 3,775,452 A | | 11/1973 | Karstedt |
| 4,292,434 A | | 9/1981 | Lindner et al. |
| 4,504,645 A | | 3/1985 | Melancon |
| 5,241,034 A | | 8/1993 | Herzig et al. |
| 5,811,487 A | | 9/1998 | Schulz, Jr. et al. |
| 5,880,210 A | | 3/1999 | Schulz, Jr. et al. |
| 6,013,682 A | * | 1/2000 | Dalle et al. |

FOREIGN PATENT DOCUMENTS

| | | |
|---|---|---|
| EP | 0 110 370 B1 | 4/1987 |
| EP | 0 414 938 A1 | 3/1991 |
| EP | 0 874 017 A2 | 10/1998 |

* cited by examiner

Primary Examiner—Robert Dawson
Assistant Examiner—Kuo-Liang Peng
(74) Attorney, Agent, or Firm—Brooks & Kushman P.C.

(57) ABSTRACT

A process for the preparation of multiphase formulations of organosilicon compounds by (A) formation of a mixture containing organic compound(s) (1) containing at least two aliphatic double bonds and of the general formula $$R^2(CR^1=CH_2)_x, \qquad (1)$$

in which $R^1$ are a hydrogen atom or an alkyl radical having 1 to 6 carbon atoms per radical, $R^2$ is a divalent, trivalent or tetravalent hydrocarbon radical having 1 to 25 carbon atoms per radical; and x denotes 2, 3 or 4 corresponding to the valence of $R^2$; and an organopolysiloxane (2) having on average more than one Si-bonded hydrogen atom per molecule;

a catalyst (3) promoting the addition of Si-bonded hydrogen at an aliphatic double bond;

an emulsifier (4); and an agent (5) immiscible with (1) and (2); and (B) emulsification of the mixture, with the proviso that the ratio of aliphatic double bond in organic compound (1) to Si-bonded hydrogen in the organopolysiloxane (2) in (A) is such that toluene-soluble siloxane copolymers are obtained.

20 Claims, No Drawings

MULTIPHASE FORMULATIONS OF ORGANOSILICON COMPOUNDS

TECHNICAL FIELD

The invention relates to multiphase formulations of organosilicon compounds, and particularly to a process for their preparation.

BACKGROUND ART

EP-A 414 938 (Nippon Unicar Company Limited, Mar. 6, 1991) describes compositions which contain a crosslinkable thermoplastic resin, an organic peroxide and a linear organopolysiloxane. The linear organopolysiloxane is obtained by reacting α,ω-dihydrogensiloxanes with α,ω—dienes in the presence of platinum catalysts. The linear polymers contain at least one terminal C=C double bond.

U.S. Pat. No. 5,241,034 (Wacker-Chemie GmbH, Aug. 31, 1993) discloses siloxane copolymers bearing linear or branched 1-alkenyl groups, prepared by polyaddition of hydrogensiloxanes and olefins having at least two terminal C=C double bonds so that they contain siloxane and hydrocarbon blocks alternately. The siloxane copolymers have a preferred viscosity of from 10 to 10,000 mPa·s at 25° C. The olefins having at least two terminal C=C double bonds have the disadvantage that the terminal C=C double bonds isomerize in the presence of Si—H groups and noble metal catalysts to form thermodynamically more stable internal double bonds, which are then substantially inactive to hydrosilylation, i.e. the polyaddition stops.

EP-A 874 017 (Dow Corning S.A., laid open on Oct. 28, 1998) describes a process for the preparation of a silicone-in-water emulsion, in which a composition containing two different inter-reactive linear polysiloxanes which chain extend in the presence of a hydrosilylation catalyst is emulsified in water in the presence of an emulsifier. Emulsions of polysiloxanes having a wide range of monodisperse particle sizes and molecular weights are obtained. The polyaddition of the two linear polysiloxanes is effected in the disperse phase, and emulsions of highly viscous polymers may be obtained.

DISCLOSURE OF INVENTION

It was an object of the present invention to provide a process for the preparation of multiphase formulations of organosilicon compounds, in particular a process for the preparation of aqueous emulsions of organosilicon compounds, which is simple and in which only one type of organopolysiloxane is necessary, and in which branched organosilicon compounds are also obtained. It was a further object to provide multiphase formulations of organosilicon compounds, in particular aqueous emulsions of organosilicon compounds, the organosilicon compounds having a high viscosity. These and other objects are achieved by the invention.

BEST MODE FOR CARRYING OUT THE INVENTION

The invention relates to a process for the preparation of multiphase formulations of organosilicon compounds by (A) providing a mixture comprising an organic compound (1) containing at least two aliphatic double bonds and of the general formula $$R^2(CR^1=CH_2)_x, \quad (1)$$

in which $R^1$ are a hydrogen atom or an alkyl radical having 1 to 6 carbon atoms per radical, $R^2$ is a divalent, trivalent or tetravalent hydrocarbon radical having 1 to 25 carbon atoms per radical, and x denotes 2, 3 or 4, corresponding to the valence of $R^2$, and an organopolysiloxane (2) having on average more than one Si-bonded hydrogen atom per molecule, a catalyst (3) which promotes the addition of Si-bonded hydrogen at an aliphatic double bond, an emulsifier (4), and an agent (5) immiscible with (1) and (2), and (B) emulsifying the mixture, with the proviso that the ratio of aliphatic double bonds in organic compound (1) to Si-bonded hydrogen in the organopolysiloxane (2) of step (A) is such that toluene-soluble siloxane copolymers are obtained. In the claims, the terms "a" and "an" mean "one or more" unless indicated otherwise.

The invention furthermore relates to multiphase formulations of organosilicon compounds which can be prepared by (A) providing a mixture comprising an organic compound (1) containing at least two aliphatic double bonds, corresponding to the general formula $$R^2(CR^1=CH_2)_x, \quad (1)$$

in which $R^1$ are a hydrogen atom or an alkyl radical having 1 to 6 carbon atoms per radical, $R^2$ is a divalent, trivalent or tetravalent hydrocarbon radical having 1 to 25 carbon atoms per radical, and x denotes 2, 3 or 4, corresponding to the valence of $R^2$, and an organopolysiloxane (2) having on average more than one Si-bonded hydrogen atom per molecule, a catalyst (3) which promotes the addition of Si-bonded hydrogen at an aliphatic double bond, an emulsifier (4), and an agent (5) immiscible with (1) and (2), and (B) emulsifying the mixture, with the proviso that the ratio of aliphatic double bonds in organic compound (1) to Si-bonded hydrogen in the organopolysiloxane (2) of step (A) is such that toluene-soluble siloxane copolymers are obtained.

The process according to the invention, is preferably a process for the preparation of two-phase formulations. In the latter process, water is preferably used as the agent (5) which is immiscible with (1) and (2). Thus, aqueous dispersions, preferably aqueous emulsions, are therefore preferably obtained as multiphase formulations.

In the subject invention process, the siloxane copolymers obtained are those which are soluble in toluene, i.e. uncrosslinked siloxane copolymers are obtained, in contrast to toluene-insoluble siloxane copolymers which are crosslinked. The siloxane copolymers are soluble in toluene in any mixing ratio; they are preferably soluble in an amount of 100% by weight in toluene at a temperature of 25° C. and a pressure of about 1020 hPa, if siloxane copolymers and toluene are mixed in the ratio 1:1 (parts by weight).

In the siloxane copolymers obtained by the subject process invention, the siloxane blocks are linked to one another via hydrocarbon groups, resulting in a hydrocarbon-siloxane block structure. Preferably, the sum of the hydrocarbon groups in the siloxane copolymers is preferably from 0.1 to 70% by weight, more preferably from 0.1 to 10% by weight, based in each case on the total weight of the siloxane copolymers. The polyaddition process inevitably leads to a polymer distribution with respect to both the siloxane blocks and to the hydrocarbon blocks.

The siloxane copolymers obtained preferably have a minimum viscosity of about 20,000 mPa·s at 25° C., more preferably 500,000 mPa·s at 25° C., and most preferably $1 \times 10^6$ mPa·s at 25° C., and preferably a maximum viscosity of, up to $5 \times 10^8$ mPa·s at 25° C., more preferably up to $1 \times 10^8$ mPa·s at 25° C.

Examples of alkyl radicals $R^1$ are the methyl, ethyl, n-propyl, isopropyl, n-butyl, isobutyl, tert-butyl, n-pentyl, isopentyl, neopentyl and tert-pentyl radicals, and hexyl radicals such as the n-hexyl radical. $R^1$ is preferably a hydrogen atom.

Examples of organic compounds (1) which have at least two aliphatic double bonds and are used in the process according to the invention are 1,5-hexadiene, 1,7-octadiene, 1,9-decadiene, 1,11-dodecadiene, 1,13-tetradecadiene, 3,5-dimethyl-1,6-heptadiene, 3,5-dimethyl-4-vinyl-1,6-heptadiene, 1,2,4-trivinylcyclohexane, 1,3,5-trivinylcyclohexane, 1,4-divinylbenzene and 1,2,3,4-tetravinylcyclobutane, 1,2,4-trivinylcyclohexane and 1,7-octadiene being preferred.

Examples of the radical $R^2$ are therefore those of the formula

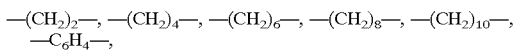

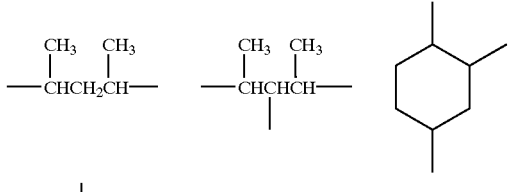

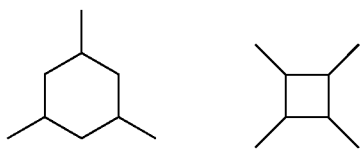

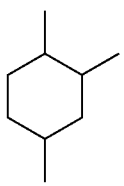

the radicals of the formula
and

being preferred.

Preferably, the organopolysiloxanes (2) used in the process according to the invention contain on average at least 1.5 Si-bonded hydrogen atoms, preferably on average at least 2 Si-bonded hydrogen atoms, per molecule. Most preferably, the organopolysiloxanes (2) used in the process according to the invention contain from 2 to 4 Si-bonded hydrogen atoms per molecule.

In the process of the invention, one type of organopolysiloxane (2) or different types of organopolysiloxane (2) can be used. As a result of their method of preparation, organopolysiloxanes (2) are generally mixtures, i.e., organopolysiloxanes having 2 Si-bonded hydrogen atoms per molecule contain some organopolysiloxanes having only one Si-bonded hydrogen atom per molecule.

Organopolysiloxanes (2) preferably used in the subject invention process are those of the general formula

    (II)

in which

R are identical or different, optionally halogenated hydrocarbon radicals having 1 to 18 carbon atom(s) per radical, e is 0 or 1, on average from 0.002 to 1.0, f is 0, 1, 2 or 3, on average from 1.0 to 2.0, and the sum of e+f is not greater than 3.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl and tert-pentyl radicals; hexyl radicals such as the n-hexyl radical; heptyl radicals such as the n-heptyl radical; octyl radicals such as the n-octyl radical, and isooctyl radicals such as the 2,2,4-trimethylpentyl radical; nonyl radicals such as the n-nonyl radical; decyl radicals such as the n-decyl radical; dodecyl radicals such as the n-dodecyl radical; and octadecyl radicals such as the n-octadecyl radical; cycloalkyl radicals such as cyclopentyl, cyclohexyl, cycloheptyl and methylcyclohexyl radicals; aryl radicals such as the phenyl, naphthyl, anthryl and phenanthryl radicals; alkaryl radicals, such as o-, m- and p-tolyl radicals, xylyl radicals and ethylphenyl radicals; and aralkyl radicals, such as the benzyl radical and the α- and the ω-phenylethyl radicals. The methyl radical is preferred.

Examples of substituted radicals R are haloalkyl radicals, such as the 3,3,3-trifluoro-n-propyl radical, the 2,2,2,2',2',2'-hexafluoroisopropyl radical and the heptafluoroisopropyl radical, and haloaryl radicals such as the o-, m- and p-chlorophenyl radical.

Organopolysiloxanes (2) preferably used in the process according to the invention are those of the general formula

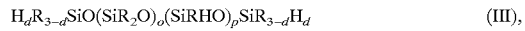    (III), in which

R has the meaning mentioned above therefor, d is 0 or 1, in particular 1, o is 0 or an integer from 1 to 1000 and p is 0 or an integer from 1 to 6, in particular 0.

The organopolysiloxanes (2) preferably have a viscosity of from 0.5 to 20,000 mPa·s at 25° C., preferably from 20 to 2000 mPa·s at 25° C.

Preferred examples of organopolysiloxanes of the formula (III) are copolymers comprising dimethylhydrogensiloxane units and dimethylsiloxane units; copolymers comprising dimethylhydrogensiloxane units, dimethylsiloxane units and methylhydrogensiloxane units; copolymers comprising trimethylsiloxane units and methylhydrogensiloxane units; and copolymers comprising trimethylsiloxane units, dimethylsiloxane units and methylhydrogensiloxane units. Particularly preferred examples of organopolysiloxanes of the formula (III) are copolymers comprising dimethylhydrogensiloxane units and dimethylsiloxane units. Processes for the preparation of organopolysiloxanes having at least two Si-bonded hydrogen atoms per molecule, including those preferred, are generally known.

Organic compound (1) is used in the process according to the invention in amounts such that the ratio of aliphatic double bonds in the organic compound(s) (1) to Si-bonded hydrogen in the organopolysiloxane(s) (2) is preferably from 0.1:1 to 20:1.

If the organopolysiloxane (2) is an α,ω-dihydrogensiloxane and the organic compound (1) is an α,ω-diene, the C=C/SiH ratio may be varied freely in the above range. Siloxane copolymers which are freely soluble in toluene are always obtained, the C=C/SiH ratio determining the type and average chain length of the polyadduct at the end of the reaction. If this ratio is less than 1.0, SiH-functional siloxane copolymers form; if it is greater than 1.0, ω-alkenyl-functional siloxane polymers are obtained. Short polyadducts are obtained at low or high numerical ratios and long polyadducts are obtained if the numbers of C=C and SiH-groups used are identical and the reaction goes to completion.

If starting materials (1) and/or (2) which have a functionality higher than 2 are used, a larger or smaller range of the C=C/SiH ratio upward and downward from 1.0 is preferably avoided so that toluene-soluble siloxane copolymers may be obtained. The useful range can be determined experimentally depending on the type and amount of the starting materials (1) or (2). In general, it is true that the higher the average functionality of the starting materials (1) or (2), the more nonstoichiometric must the ratio in which they are used be in order to obtain toluene-soluble siloxane copolymers.

If the starting materials (1) and (2) are each bifunctional, i.e. an α,ω-dihydrogensiloxane and an α,ω-diene are used, the C=C/SiH ratio is preferably from 0.5 to 2.0, more preferably from 0.8 to 1.2, and most preferably from 0.9 to 1.1. At a C=C/SiH ratio of from 0.9 to 1.1, highly viscous siloxane copolymers may be obtained. In order to obtain such highly viscous siloxane copolymers, the following preconditions must generally be fulfilled: the starting materials (1) and (2) must each have well defined terminal groups, i.e. a functionality of 2.0; during the polyaddition, secondary reactions such as the conversion of Si—H into Si—OH or the isomerization of 1-alkenyl to 2-alkenyl groups, may occur only to a minor extent; and the polyaddition must go essentially to completion. The occurrence of groups which are unreactive in the context of the polyaddition, such as SiOH or 2-alkenyl groups, leads to termination of the polyaddition by these starting materials since they are defacto monofunctional and thus act as chain stoppers in polyaddition reactions. Examples of species leading to the termination of the polyaddition are 1,6-octadiene or $HR_2SiO(R_2SiO)_0R_2SiOH$.

If at least one of the starting materials (1) and (2) has a functionality higher than 2, multiphase formulations of polymers which have branched structures are obtained. The degree of branching in each case is dependent on the actual functionality and on the stoichiometric ratio used. The higher the respective functionality of the starting materials (1) and (2), the more highly branched are the structures which may be obtained, and also the further is the range of the C=C/SiH above or below the ratio 1.0. It is therefore also not possible to state a generally preferred range of the C=C/SiH ratio used but only one which is dependent on the functionality of the starting materials (1) and (2), as in the following Table:

| Functionality of the starting materials (1) | Functionality of the starting materials (2) | Particularly preferred C = C/SiH ratio |
| --- | --- | --- |
| 2 | 3 | 2.5:1 to 1.6:1 and 0.4:1 to 0.6:1 |
| 2 | 4 | 3.0:1 to 2.2:1 and 0.3:1 to 0.45:1 |
| 2 | 5 | 4.0:1 to 2.8:1 and 0.25:1 to 0.35:1 |
| 3 | 2 | 2.5:1 to 1.6:1 and 0.4:1 to 0.6:1 |
| 3 | 3 | 3.0:1 to 2.2:1 and 0.3:1 to 0.45:1 |
| 3 | 4 | 4.0:1 to 2.8:1 and 0.25:1 to 0.35:1 |
| 4 | 2 | 3.0:1 to 2.2:1 and 0.3:1 to 0.45:1 |
| 4 | 3 | 4.0:1 to 2.8:1 and 0.25:1 to 0.35:1 |

The functionality of the starting materials (1) means the number of aliphatic double bonds (C=C) in organic compound (1), while the functionality of the starting materials (2) means the average number of Si-bonded hydrogen atoms (SiH) in organopolysiloxane (2).

The same catalysts which may be used for promoting the addition of Si-bonded hydrogen at an aliphatic double bond can be used in the process according to the invention as catalysts (3) promoting the addition of Si-bonded hydrogen at an aliphatic double bond. The catalysts (3) preferably comprise a metal from the group consisting of the platinum metals or a compound or a complex from the group consisting of the platinum metals. Examples of such catalysts are metallic and finely divided platinum, which may be present on supports such as silica, alumina or active carbon, compounds or complexes of platinum such as platinum halide, e.g. $PtCl_4$, $H_2PtCl_6·6H_2O$ or $Na_2PtCl_4$—$4H_2O$, platinum-olefin complexes, platinum-alcohol complexes, platinum-alcoholate complexes, platinum-ether complexes, platinum-aldehyde complexes, platinum-ketone complexes, including reaction products of $H_2PtCl_6·6H_2O$ and cyclohexanone, platinum-vinylsiloxane complexes such as platinum-1,3-divinyl-1,1,3,3-tetramethyldisiloxane complexes with or without a content of detectable inorganically bonded halogen, bis(gamma-picolinyl)platinum dichloride, trimethylenedipyridylplatinum dichloride, dicyclopentadienylplatinum dichloride, dimethylsulfoxydiethyleneplatinum(II) dichloride, cyclooctadienylplatinum dichloride, norbornadienylplatinum dichloride, gamma-picolinylplatinum dichloride, cyclopentadienylplatinum dichloride and reaction products of platinum tetrachloride with olefin and primary amine or both secondary amine or primary and secondary amines according to U.S. Pat. No. 4 292 434, such as the reaction product of platinum tetrachloride dissolved in 1-octene with sec-butylamine, and ammonium-platinum complexes according to EP-B 110 370.

The catalyst (3) is preferably used in amounts from 0.5 to 1000 ppm by weight (parts by weight per million parts by weight), preferably in amounts from 2 to 50 ppm by weight, calculated in each case as elemental platinum and based on the total weight of organic compound (1) and organopolysiloxane (2).

All known ionic and nonionic emulsifiers, both individually and as mixtures of different emulsifiers, with which multiphase formulations of organosilicon compounds, preferably aqueous dispersions, and in particular aqueous emulsions may be prepared can be used as emulsifiers (4) in the process according to the invention.

Examples of nonionic emulsifiers are sorbitan esters of fatty acids having 10 to 22 carbon atoms; polyoxyethylene sorbitan esters of fatty acids having 10 to 20 carbon atoms and an ethylene oxide content of up to 35%; polyoxyethylene sorbitol esters of fatty acids having 10 to 22 carbon atoms; polyoxyethylene derivatives of phenols having 6 to 20 carbon atoms in the aromatic portion and an ethylene oxide content of up to 95%; fatty amino- and amidobetaines having 10 to 22 carbon atoms; polyoxyethylene condensates of fatty acids or fatty alcohols having 10 to 22 carbon atoms with an ethylene oxide content of up to 95%; polyvinyl alcohols having 5 to 50% of vinyl acetate units and having a degree of polymerization of from 500 to 3000; and castor oil ethoxylates having 20 to 200 ethylene oxide units.

Examples of ionic emulsifiers are: alkarylsulfonates having 6 to 20 carbon atoms in the alkyl group; fatty acid soaps having 10 to 22 carbon atoms in the alkyl group; fatty acid soaps having 10 to 22 carbon atoms; fatty sulfates having 10 to 22 carbon atoms; alkanesulfonates having 10 to 22 carbon atoms; alkali metal salts with dialkylsulfosuccinates; fatty amine oxides having 10 to 22 carbon atoms; fatty imidazolines having 6 to 20 carbon atoms; fatty amidosulfobetaines having 10 to 22 carbon atoms; quaternary surfactants, such as fatty ammonium compounds having 10 to 22 carbon atoms; fatty morpholine oxides having 10 to 22 carbon atoms; alkali metal salts of carboxylated ethoxylated alcohols having 10 to 22 carbon atoms and up to 95% of ethylene oxide; ethylene oxide condensates of fatty monoesters of glycerol having 10 to 22 carbon atoms and up to 95% of ethylene oxide; mono- and diethanolamides of fatty acids having 10 to 22 carbon atoms; alkoxylated silicone surfactants having ethylene oxide and/or propylene oxide units; and phosphate esters.

As is well known in the area of surfactants, the counter ions in the case of anionic surfactants may be alkali metals, ammonia, or substituted amines such as triethylamine or triethanolamine. In the case of cationic surfactants, the counter ion may be a halide, sulfate or methylsulfate. Chlorides are the compounds most generally available industrially.

In the process according to the invention, emulsifier (4) is preferably used in amounts of from 1 to 20% by weight, preferably from 3 to 15% by weight, based on the total weight of the components (1) and (2).

Further examples of agents (5) which are immiscible with (1) and (2) and can be used in the process according to the invention are polyalkylene oxide compounds which are limpidly and homogenously miscible with water in any ratio.

In the process according to the invention, agent (5) which is immiscible with (1) and (2), and is preferably water (5), is preferably used in amounts of from 10 to 90% by weight, more preferably from 40 to 70% by weight, based on the total weight of the components (1) and (2).

In the process according to the invention, the mixture (A) is converted into multiphase formulations, preferably aqueous dispersions and more preferably emulsions, all of which are stable over a relatively long period of time, by means of conventional techniques such as employing rotor-stator or dissolver stirring apparatuses, or by using high-pressure homogenizers.

The process according to the invention preferably takes place in the presence of water in the oil phase, either with a continuous oil phase with water droplets or a continuous water phase with oil droplets. Preferably, the emulsion is an oil-in-water emulsion, which has the advantage that emulsions comprising high molecular weight siloxane copolymers can be prepared in situ in the oil phase. It is therefore possible to prepare emulsions comprising high molecular weight siloxane copolymers by the process according to the invention. This was previously impossible.

The total amount of water (5) can be added in two or more parts before and/or during the preparation of the dispersion or emulsion. A preferred embodiment of the process according to the invention comprises the addition of only a small part of the total amount of water in amounts of from 1 to 6% by weight based on the total weight of water used, to the components (1) and (2). The polyaddition is effected in a viscous phase which possesses a creamy consistency and has a viscosity, typically, of more than 100,000 mPa·s at 25° C. After the addition of the remaining amount of the water, an oil-in-water emulsion is then formed.

In the process according to the invention, the components (1) to (5) can be mixed with one another in any desired sequence. Preferably, the catalyst (3) is added last to the mixture, before or during the preparation of the dispersion or emulsion. Preferably, a small part of the total amount of water (5) is mixed with emulsifier (4), organopolysiloxane (2) and organic compound (1), and catalyst (3) is added, a highly viscous phase forming and then being converted, after addition of remaining amounts of water, to an oil-in-water dispersion, preferably an oil-in-water emulsion.

In a further embodiment of the process according to the invention,
 (i) a mixture containing
  organopolysiloxane (2), emulsifier (4), and a small part of the total amount of water (5) is formed;
 (ii) organic compound (1) is added to the mixture (i);
 (iii) catalyst (3) is then added to the mixture (ii), and
 (iv) the mixture (iii) is emulsified with the remaining amount of water (5).

A portion of the remaining amount of the water (5) can also be added after the formation of the mixture (i). This embodiment has the advantage that no premixing of the components (1) and (2) is required and the pure raw materials can be fed separately into the process.

After the multiphase formulation comprising organosilicon compounds has been obtained, a further emulsifier (6) having a molecular weight (number average $M_n$) of at least 1000 Daltons can be added. The further emulsifier (6) may be one type of emulsifier or a mixture of different types of emulsifiers. Preferably, nonionic emulsifiers are used. Preferred examples of further emulsifiers (6) are castor oil ethoxylates having from 20 to 200 ethylene oxide units. Further emulsifier (6) is preferably used in amounts of from 0.3 to 3.0% by weight based on the total weight of the multiphase formulation. This measure has the advantage that the multiphase formulations according to the invention, preferably aqueous emulsions, have improved stability during or after mixing with organic dispersions, and incompatibilities such as crater formation or the formation of pinholes are prevented.

In the process according to the invention, inert organic solvents may be concomitantly used, although such is not preferred. Examples of inert, organic solvents are toluene, xylene, octane isomers, butyl acetate, 1,2-dimethoxyethane, tetrahydrofuran and cyclohexane. Furthermore, low molecular weight siloxanes, such as hexamethyldisiloxane, octamethyltrisiloxane or other low molecular weight oligomers, and cyclic dialkylsiloxanes having 3 to 14 siloxy units can be added for regulating the viscosity profile or for aiding to handling.

In a specific embodiment, it is possible to add siloxanes which have average molecular weights of from a few hundred to about 20,000 Daltons, provided that they do not hinder the polyaddition of the components (1) and (2). Examples of these are alkyl-terminated polydimethylsiloxanes having a degree of polymerization approximately in the range from about 10 to 250, also known as silicone oils. The amount of these additives can be from a few percent to about four times the total weight of the components (1) and (2). The added amount is dependent only on the properties which the disperse phase is to have.

If desired from a process engineering standpoint, an agent which retards the addition of Si-bonded hydrogen at an aliphatic multiple bond at room temperature may be added, for example, to the mixture of organic compound (1) and organopolysiloxane (2). All inhibitors which retard the addition of Si-bonded hydrogen at an aliphatic multiple bond at room temperature may be used as inhibitors. Examples of inhibitors are 1,3-divinyl-1,1,3,3-tetramethyldisiloxane, benzotriazole, dialkylformamides, alkylthioureas, methyl ethyl ketoxime, organic or organosilicon compounds having a boiling point of at least 25° C. at 1012 mbar (abs.) and at least one aliphatic triple bond according to U.S. Pat. No. 3,445,420, such as 1-ethynylcyclohexan-1-ol, 2-methyl-3-butyn-2-ol, 3-methyl-1-pentyn-3-ol, 2,5-dimethyl-3-hexyne-2,5-diol and 3,5-dimethyl-1-hexyn-3-ol, 3,7-dimethyloct-1-yn-6-en-3-ol, inhibitors according to U.S. Pat. No. 2,476,166, such as a mixture of diallyl maleate and vinyl acetate, and inhibitors according to U.S. Pat. No. 4,504,645, such as monoesters of maleic acid. Preferably, the inhibitor is used in amounts of from 0.001 to 10% by weight, based on the total weight of the components (1) and (2), the amount of from 0.005 to 0.01% by weight being preferred.

The process of the invention is preferably carried out at the pressure of the surrounding atmosphere, i.e. at about 1020 hPa (abs.), but it can also be carried out at higher or lower pressures. It is preferably carried out in a temperature range from 0° C. to 160° C., more preferably from 20° C. to 120° C. The process for the preparation of an aqueous dispersion, or preferably an aqueous emulsion, may be carried out in a temperature range from 0° C. to 80° C. The process according to the invention can be carried out batchwise, semicontinuously or completely continuously.

The inventive process has the advantage that no low molecular weight volatile or cyclic byproducts without terminal functions are obtained, and that the organopolysiloxanes (2) used are, if required, easy to purify. The removal of byproducts, for example by distillation (heating up in vacuo) is therefore omitted, which is advantageous particularly in the case of relatively high molecular weight organopolysiloxanes (2) which have relatively high viscosity, which complicates the removal of the byproducts owing to the relatively high viscosity of the end products, and prevents complete removal.

The multiphase formulation according to the invention, preferably an aqueous dispersion, more preferably an aqueous emulsion, preferably contains siloxane copolymers in amounts from 20 to 70% by weight, more preferably from 35 to 60% by weight. The aqueous dispersions and emulsion, have a particle size of preferably from 100 to 500 nm, more preferably from 150 to 300 nm.

The multiphase formulations, preferably aqueous dispersions or emulsions of siloxane copolymers which are obtained by the process according to the invention, may be used for hydrosilylation reactions, as polymer raw materials for building up networks, and for the preparation of telecheles having identical or different terminal groups. They may also be used for the surface treatment of flexible materials such as leather or imitation leather, e.g. of polyurethane, and of rigid surfaces such as floors of stone, artificial stone, plastics, or tiles of ceramic, earthenware or stoneware. Application in a thin layer produces a controlled sliding effect.

EXAMPLE 1

7.4 g of distilled water, 32 g of an 80% strength aqueous solution of an isotridecyl alcohol ethoxylate of the average formula $C_{13}H_{27}O(C_2H_4O)_{10}H$, and 350 g of a mixture of 0.65 part by weight of 1,7-octadiene and 99.35 parts by weight of an α,ω-dihydrogenpolydimethylsiloxane having 0.0119% by weight of Si-bonded hydrogen are initially introduced into a container and mixed in a dissolver at a speed of 1500 rpm.

640 mg of a Karstedt catalyst solution having a Pt content of 1.1% by weight (platinum-1,3-divinyl-1,1,3,3-tetramethyldisiloxane complex according to U.S. Pat. No. 3,775,452, Bruce D. Karstedt, General Electric Company, published on Nov. 27, 1973) are then incorporated until a highly viscous phase forms. This is then processed rapidly with 400 g of distilled water at decreasing speed (from 5000 to 1000 rpm) to give a milky white, smooth emulsion which has a mean particle size of 250 nm.

By adding acetone to a part of the emulsion, the resulting high polymer is precipitated and dried. It is soluble in toluene and has a viscosity of $1.3 \times 10^7$ mPa·s at 25° C. and an average molecular weight (Mw) of 415,000. Neither SiH nor 1-octenyl groups are detectable by $^1$H-NMR, even with very high magnification of the range from 4.5 to 6.0 ppm. The emulsion, when stored at 25° C., is stable for more than 6 months.

EXAMPLE 2

The procedure of Example 1 was repeated using 350 g of a mixture of 1.14 parts by weight of 1,2,4-trivinylcyclohexane and 98.86 parts by weight of an α,ω-dihydrogenpolydimethylsiloxane having 0.0119% by weight of Si-bonded hydrogen instead of the mixture described in Example 1, and comprising 1,7-octadiene and α,ω-dihydrogenpolydimethylsiloxane. The emulsion obtained, having a mean particle size of 220 nm, is stable and unchanged at 25° C. for more than 6 months. A viscosity of $3.9 \times 10^6$ mPa·s at 25° C. is determined for the precipitated polymer. The polymer is soluble in toluene and has a C=C equivalent of 10,650 g/C=C.

EXAMPLE 3

In accordance with the procedure of Example 1,350 g of a mixture of 0.40 part by weight of 1,2,4-trivinylcyclohexane and 99.60 parts by weight of an α,ω-dihydrogenpolydimethylsiloxane having 0.0119% by weight of Si-bonded hydrogen are used. The precipitated highly branched polymer is soluble in toluene and has a viscosity of more than $2 \times 10^7$ mPa·s at 25° C. The GPC spectrum (gel permeation chromatography) shows a multimodal, very broad distribution of molecular weights up to more than $10^6$ g/mol. The polymer has an Si—H equivalent weight of 22,500 g/SiH. The emulsion has a mean particle size of 240 nm and is stable at 25° C. for longer than 6 months.

EXAMPLE 4

The procedure is initially as in Example 1. Before the admixing of the platinum catalyst, however, 10 g of distilled water are incorporated until a highly viscous phase forms. This is then slowly diluted with 80 g of distilled water, after which 640 mg of the Karstedt catalyst solution having a platinum content of 1.1% by weight are incorporated. A translucent creamy material which is stable for months at 25° C. is obtained. For the preparation of an emulsion having a solids content of 50%, half of the creamy material obtained is diluted with 150 g of distilled water at decreasing stirrer speed. The resulting milky white emulsion has a particle size of 250 nm and is stable at 25° C. for more than 6 months.

EXAMPLE 5

17.0 g of distilled water and 50.0 g of an 80% strength aqueous solution of an isotridecyl alcohol ethoxylate of the average formula $C_{13}H_{27}O(C_2H_4O)_{10}H$ are mixed in a container. A total of 349.5 g of an α,ω-dihydrogenpolydimethylsiloxane (corresponding to 56 mg of Si-bonded hydrogen) are metered into this mixture in a dissolver at 1000 rpm, whereupon a highly viscous phase forms. 90.0 g of distilled water are fed in via a metering pump over a period of 4 minutes and the mixture achieves a creamy consistency. Thereafter, 2.33 g of 1,7-octadiene and 640 mg of the Karstedt catalyst solution from Example 1 are fed in succession at about 5500 rpm and distributed throughout the creamy material. At decreasing stirrer speed, a total of 300 ml of distilled water are then metered in over the course of 10 minutes, first slowly and then more rapidly. The filtered emulsion has a mean particle size of 190 nm. The polymer, when precipitated with acetone, is soluble in toluene and has a viscosity of $1.4 \times 10^6$ mPa·s at 25° C. No 1-octenyl groups are detectable.

EXAMPLE 6

After preparation, the filtered emulsion from Example 5 is mixed with the various amounts of a 50% strength solution of a high molecular weight emulsifier in water. The emulsifier is a castor oil ethoxylate having an average molecular weight of about 4500 Dalton, commercially available as a 50% strength aqueous solution under the name G 1300 from Atlas. The following amounts of the emulsifier are added per 100 ml of emulsion:

0.7 g of Atlas G 1300

1.4 g of Atlas G 1300, and 2.8 g of Atlas G 1300, respectively.

In all three cases, no change in particle size is observed; the emulsions are stable and unchanged.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for the preparation of multiphase formulations of organosilicon compounds, said process comprising:
(A) supplying a mixture containing an organic compound
   (1) containing at least two aliphatic double bonds having the general formula $$R^2(CR^1=CH_2)_x, \quad (1)$$

in which
   $R^1$ are a hydrogen atom or an alkyl radical having 1 to 6 carbon atoms per radical,
   $R^2$ is a divalent, trivalent or tetravalent hydrocarbon radical having 1 to 25 carbon atoms per radical,
   and x denotes 2, 3 or 4, corresponding to the valence of $R^2$; and
   an organopolysiloxane (2) having on average more than one Si-bonded hydrogen atom per molecule;
   a catalyst (3) which promotes the addition of Si-bonded hydrogen at an aliphatic double bond;
   an emulsifier (4); and
   an agent (5) immiscible with (1) and (2) and
(B) emulsifying the mixture,
with the proviso that the ratio of aliphatic double bonds in organic compound(s) (1) to Si-bonded hydrogen in the organopolysiloxane(s) (2) is such that toluene-soluble siloxane copolymers are obtained.

2. The process of claim 1, wherein siloxane copolymers having a viscosity of from 500,000 mPa·s to $5 \times 10^8$ mPa·s at 25° C. are obtained.

3. The process of claim 1, wherein siloxane copolymers having a viscosity of $1 \times 10^6$ mPa·s to $1 \times 10^8$ mPa·s at 25° C. are obtained.

4. The process of claim 1, wherein said process is a process for the preparation of a two-phase formulation.

5. The process of claim 1 wherein the agent (5) immiscible with (1) and (2) comprises water.

6. The process of claim 5 wherein the multiphase formulation is an aqueous dispersion.

7. The process of claim 5 wherein the multiphase formulation 2 is an aqueous emulsion.

8. The process of claim 1 wherein $R^1$ is a hydrogen atom.

9. The process of claim 1 wherein the organopolysiloxane (2) has the general formula $$H_dR_{3-d}SiO(SiR_2O)_o(SiRHO)_pSiR_{3-d}H_d \quad (III),$$

in which
$R$ are identical or different, optionally halogenated $C_{1-18}$ hydrocarbon radicals,
d is 0 or 1,
o is 0 or an integer from 1 to 1000 and
p is 0 or an integer from 1 to 6.

10. The process of claim 9, wherein d is 1 and p is 0.

11. The process of claim 1, wherein (i) organopolysiloxane (2), emulsifier (4) and a first part of water (5) are mixed to form a highly viscous phase;

(ii) organic compound (1) is added to the mixture (i);

(iii) catalyst (3) is then added to the mixture (ii); and (iv) the mixture (iii) is emulsified with additional water (5).

12. The process of claim 1, wherein a further emulsifier (6) having a molecular weight of at least 1000 Daltons is added after the multiphase formulation is obtained.

13. The process of claim 12, wherein castor oil ethoxylates having 20 to 200 ethylene oxide units are used as the further emulsifier (6).

14. The process of claim 1 wherein the agent (5) immiscible with (1) and (2) is a polyalkylene oxide compound which is limpidly and homogenously miscible with water in any ratio.

15. A multiphase formulation of organosilicon compounds prepared by the process of claim 1.

16. The multiphase formulation of organosilicon compounds of claim 15, wherein said toluene-soluble siloxane copolymers have a viscosity of from 500,000 mPa·s to $5 \times 10^8$ mPa·s at 25° C.

17. The multiphase formulation of organosilicon compounds of claim 15, wherein said siloxane copolymers have a viscosity of from $1\times10^6$ mPa·s to $1\times10^8$ mPa·s at 25° C.

18. The multiphase formulation of organosilicon compounds of claim 15, wherein said toluene-soluble siloxane copolymers have a viscosity of from 500,000 mPa·s to $5\times10^8$ mPa·s at 25° C., agent (5) comprises water, and organic compound (1) comprises one or more compounds selected from the group consisting of 1,7-octadiene and 1,2,4-trivinylcyclohexane.

19. The multiphase formulation of claim 15 wherein said multiphase formulation is a two-phase formulation.

20. The multiphase formulation of claim 17 wherein said multiphase formulation is a two-phase formulation.

* * * * *